United States Patent Office 3,004,017
Patented Oct. 10, 1961

3,004,017
PROCESS OF OLEFIN POLYMERIZATION WITH CATALYSTS CONTAINING TETRAPHENYLBORATES
George O. Cash, Jr., and Harry W. Coover, Jr., Kingsport, Tenn., assignors to Eastman Kodak Company, Rochester, N.Y., a corporation of New Jersey
No Drawing. Filed Nov. 6, 1958, Ser. No. 772,160
9 Claims. (Cl. 260—93.7)

This invention relates to the catalytic polymerization of α-monoolefins to high molecular weight, highly crystalline solid polymers. In a specific aspect this invention relates to the polymerization of ethylene, propylene or mixtures thereof to form solid, high density highly crystalline polymers.

For many years, the Friedel-Crafts type catalysts, such as aluminum chloride and boron trifluoride, were used to polymerize olefins to form low molecular weight liquid polymers. Until recently, the commercial production of solid polyethylene was limited to the extremely high pressure process disclosed by Fawcett et al. in U.S. 2,153,553 wherein it was disclosed that ethylene could be polymerized to a solid waxy polymer by the use of pressures in excess of 500 atmospheres and usually of the order of 1000-2000 atmospheres. This high pressure polyethylene was characterized by a high degree of flexibility, good film-forming properties and a waxy feel. Since such high pressure polyethylene possesses a rather high degree of chain branching, however, it also exhibits a relatively low softening temperature, a low density, and relatively low crystallinity.

In recent years it has been discovered that ethylene can be polymerized in the presence of catalysts consisting of either a supported oxide of chromium, molybdenum, tungsten or uranium activated by an alkali metal, or metal alkyls and metal alkyl halides, such as aluminum triethyl or ethyl aluminum chloride, in combination with a compound of a metal from the 4th to the 6th subgroups of the Periodic Table to produce high molecular weight solid polymers of ethylene which are characterized by a high density, high crystallinity, improved melting point, and relatively greater rigidity than is characteristic of the high pressure polymers.

Thus, at the present time, the catalytic processes for preparing highly crystalline, high molecular weight solid polyolefins fall into two general categories, namely, those employing a metal oxide as catalyst and those employing a metal alkyl or alkly metal halide together with an activator. The metal oxide catalysts are used on solid supports as a catalyst bed and are subject to plugging of the bed and coating and inactivation of the catalyst unless special precautions are taken to ensure solution of the polymer as it is formed. The metal alkyls and metal alkyl halides are expensive to prepare and are difficult to handle in commercial practice due to the fact that they ignite spontaneously on contact with air. Furthermore, the catalysts used heretofore for polymerizing α-olefins to highly crystalline polymers have usually been composed of mixtures of two or more components. It is therefore desirable to have a simple and inexpensive catalyst composed of a single chemical compound whereby ethylene and similar gaseous α-monoolefins can be converted to high molecular weight solid polymer without the concomitant formation of substantial amounts low molecular weight, waxy or oily polymers at relatively low pressures and temperatures.

It is accordingly an object of this invention to provide a new and improved process for effecting conversion of normally gaseous α-monoolefins, such as ethylene or propylene, or mixtures thereof, to high molecular weight, highly crystalline solid polymers in high yield and without the concomitant formation of substantial amounts of low molecular weight waxy or liquid products. Another object of the invention is to provide a new and improved process for catalytic polymerization of ethylene and similar α-monoolefins of 2-10 carbon atoms to high density solid polymers employing a compound as a catalyst that requires no activation and is free of the objectionable handling problems characteristic of catalysts heretofore employed. Another object of the invention is to facilitate the commercial manufacture of high density, highly crystalline ethylene polymers by providing an economical process which can be readily carried out at pressures as low as atmospheric pressure and at temperatures ranging from room temperature or lower to 200° C. in high yields. Other objects will be apparent from the description and claims which follow.

These and other objects are attained by means of this invention wherein it was found unexpectedly that the normally gaseous α-monoolefins, either singly or in admixture, could be converted in high yield to high molecular weight, highly crystalline solid polymers without the concomitant formation of substantial amounts of low molecular weight waxy or liquid polymers by effecting the polymerization in the presence of a tetraphenylborate of a transition element selected from the group consisting of titanium, zirconium, vanadium, tungsten, chromium and molybdenum. It has now been found that this catalyst gives results which are comparable to or better than the best catalytic processes known heretofore for making solid polymers of improved crystallinity, melting point, and rigidity. Furthermore, the catalyst can be readily prepared and it is simple to handle in large scale manufacturing operations. The reason why the catalyst of this invention exhibits the high degree of catalytic activity is not readily understood and could not be predicted from the art wherein it is apparent that the catalytic activity is empirical and unpredictable. The specific nature of the catalyst embodying this invention is illustrated by the fact that transition element compounds, such as titanium tetrahalides and titanium tetraalkoxides, when used alone have not catalyzed α-olefins to highly crystalline polymers. An especially advantageous aspect of the single-component catalyst embodying this invention is that the desired solid polymer is not only formed in very high yield but that the concomitant formation of undesirable low molecular weight waxy or liquid polymer is markedly decreased.

The tetraphenylborates that are used in practicing this invention can be prepared, for example, by reacting a transition element halide, such as titanium tetrachloride, with an alkali metal tetraphenylborate, such as lithium tetraphenylborate. It is a surprising feature of this invention that a mixture of sodium tetraphenylborate and titanium tetrachloride is not an effective catalyst for producing highly crystalline polyolefins but, on the other hand, the tetraphenylborates of the invention which can be formed by the reaction set forth above are outstandingly effective for forming highly crystalline polyolefins.

The inventive process is preferably carried out in liquid phase in an inert organic liquid, and preferably an inert liquid hydrocarbon vehicle, and the removal of catalyst is facilitated by operating below the melting point of the polymer. The process proceeds with excellent results over a temperature range varying from −20° C. to 250° C. The preferred temperature range is 25-200° C. The pressure can be varied as desired, with pressures as low as atmospheric pressure being operable. Generally speaking, however, it is preferred to employ a pressure in the range of 25-1000 p.s.i. In some cases, higher pressures such as are employed in the conventional high pressure processes can be used but are usually not necessary. Thus, pressures of as much as 20,000 p.s.i. or higher can be used in some instances. The liquid vehicle employed is desirably one which serves both as a liquid medium and as a solvent for the solid polymerization products at the temperature of polymerization. The great increase in polymerization rate with increasing pressures makes the use of higher pressures desirable.

The invention is applicable for polymerizing any of the well-known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are soluble in such solvents as xylene, toluene or tetralin at temperatures above 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety or articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polmerizable α-monoolefins and particularly with propylene. Other monoolefins which are suitably employed either alone or in admixtures include such materials as n-butylene, iso-butylene, 1-pentene, 1-decene, allylbenzene, styrene, vinylcyclohexane and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The catalysts embodying this invention have several important advantages over the prior art processes. For example, the rate of polymerization is much faster than is ordinarily achieved with catalysts known heretofore, and the same degree of polymerization can be achieved in a few hours using the present catalyst system as required several days heretofore. Another advantage of the invention is that relatively lower pressures can be used with pressures as low as atmospheric pressure being operable. Ordinarily, moderate pressures are employed, but the use of such pressures still allows considerable economy over the conventional high pressure processes which operate in the range of 1000–2000 atmospheres in most cases. Another advantage of the catalysts embodying this invention is the fact that they are relatively cheap and safe to handle and can be used at lower concentration than most catalysts. A further important advantage is the high yield of solid high density polymer without the concomitant formation of substantial amounts of waxy, greasy or oil polymers.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. Since the catalysts employed are either readily soluble or readily dispersible in the organic liquid vehicles commonly employed, the uniformity of reaction can be readily controlled. The exact nature of the catalytic action is not wholly understood, and particularly the reason why the catalyst has such greatly increased activity is not understood. The catalyst can be separated from the polymer by any of several methods. A convenient method is to wash the product in methanol, dissolve the polymer in a xylene-2-ethtylhexanol mixture and reprecipitate the polymer by cooling the solution. The reprecipitated polymer is then filtered, heated with methanolic hydrochloric acid and washed free of acid with methanol. Alternatively, the crude polymer can be washed with methanol, heated with dilute solutions of sodium hydroxide and methanol, and finally washed with methanol and water. Either sequence affords completely colorless polymer.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from −20° C. to 250° C. can be employed as desired, the usual process adapted for commercial production is carried out at a temperature in the range of from 25° C. to 200° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a moderate pressure of from 10 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.05 to about 0.5% by weight of solvent or monomer, but concentrations up to 10% by weight and higher can be used, if desired. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethylbenzenes, mono and dialkyl naphthalenes, n-octane, iso-octane, methyl cyclohexane, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The catalysts of this invention can be used in the absence of solvent, but it is desirable to employ an anhydrous liquid vehicle for purposes of ready temperature control. The catalyst concentration is also preferably maintained in the range of from about 0.05% to about 0.5% for ready temperature control.

The following examples are illustrative of this invention.

Example 1

A stainless steel autoclave was thoroughly dried, and in a nitrogen-filled drybox was charged with 0.2 g. of titanium tetraphenylborate and 100 ml. of heptane. The pressure was increased to 300 p.s.i.g. with ethylene and the temperature was raised to 50° C. The autoclave was rocked under these conditions for eight hours. At the end of the run the product was removed from the autoclave and washed with aqueous sodium hydroxide, then with water, then with dilute sulfuric acid, and finally with water. A 50 g. yield of highly crystalline polyethylene having an inherent viscosity of 2.47 and a density of 0.957 was obtained.

Example 2

The procedure of Example 1 was repeated except that the catalyst weight was 0.1 g. and the temperature was 100° C. The yield was 39 g. of highly crystalline polyethylene. The inherent viscosity was 2.53 and the density 0.956.

Example 3

The procedure of Example 1 was repeated except that the catalyst weight was 0.05 g. and the temperature was 200° C. The yield was 27 g. of highly crystalline polyethylene of 2.01 inherent viscosity and 0.955 density.

Example 4

The procedure of Example 1 was repeated except that no heptane was used, and the olefin was 100 ml. (51 g.) of liquid propylene. The yield was 39 g. of highly crystalline polypropylene having inherent viscosity of 2.54 and density of 0.916. When this procedure was used at 25° C. for a 24 hour polymerization period, the yield of highly crystalline polypropylene was 11 g.

Example 5

The procedure of Example 1 was repeated, except that the olefin was 100 ml. of 3-methylbutene-1, and no heptane was used. The yield was 36 g. of highly crystalline polymer. The inherent viscosity was 1.99.

Example 6

In a nitrogen-filled drybox a dry 500 ml. pressure bottle was charged with 0.2 g. of titanium tetraphenylborate and 100 ml. of heptane. The bottle was connected to a reservoir which contained ethylene at 30 p.s.i.g. The temperature was raised to 50° C. and the bottle was shaken for eight hours under these conditions. Pressure charges were restored from a cylinder. At the end of the run the product was worked up as in Example 1. The yield was 31 g. of highly crystalline polyethylene. The inherent viscosity was 2.87 and the density was 0.958.

Example 7

The procedure of Example 6 was repeated using propylene in place of ethylene. The yield was 24 g. of highly crystalline polypropylene. The inherent viscosity was 2.47 and density 0.917.

Example 8

The procedure of Example 6 was repeated except that the temperature was 70° C. The yield was 35 g. of polyethylene.

Example 9

The procedure of Example 6 was repeated using vanadium tetraphenylborate as the catalyst. The yield was 28 g. of crystalline polyethylene.

Example 10

The procedure of Example 6 was repeated using vanadium tetraphenylborate as the catalyst and propylene in place of ethylene. The yield was 19 g. of crystalline polypropylene.

Example 11

The procedure of Example 6 was repeated using 0.2 g. of chromium tetraphenylborate as the catalyst. The yield was 21 g. of polyethylene.

Example 12

The procedure of Example 6 was repeated using chromium tetraphenylborate as the catalyst and propylene in place of ethylene. The yield was 17 g. of crystalline polypropylene.

Example 13

The procedure of Example 6 was repeated, using 0.3 g. of molybdenum tetraphenylborate as the catalyst. The yield was 18 g. of polyethylene.

Example 14

The procedure of Example 6 was repeated, using 0.5 g. of tungsten tetraphenylborate as the catalyst at 70° C. The yield was 15 g. of polyethylene.

Example 15

The procedure of Example 6 was repeated, using 0.5 g. of zirconium tetraphenylborate as the catalyst at 80° C. The yield was 18 g. of polyethylene. The inherent viscosity of this product was 2.01 and the density was 0.956.

The polymers obtained in accordance with this invention can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

We claim:

1. The process for polymerizing a normally gaseous α-monoolefin to solid polymer which comprises contacting said α-monoolefin with a catalyst consisting essentially of the tetraphenylborate of a transition element selected from the group consisting of titanium, zirconium, tungsten, vanadium, chromium and molybdenum at a temperature within the range of −20° C. to 250° C., the valences of said transition element being satisfied by only tetraphenylborate groups.

2. The process for polymerizing a normally gaseous α-monoolefin to solid polymer which comprises contacting said α-monoolefin with a catalyst consisting essentially of the tetraphenylborate of a transition element selected from the group consisting of titanium, zirconium, vanadium, chromium, tungsten, and molybdenum in an inert organic liquid vehicle at a temperature within the range of −20° C. to 250° C., the valences of said transition element being satisfied by only tetraphenylborate groups.

3. The process for polymerizing a normally gaseous α-monoolefinic hydrocarbon to solid polymer which comprises contacting said α-monoolefinic hydrocarbon with a catalyst consisting essentially of the tetraphenylborate of a transition element selected from the group consisting of titanium, zirconium, tungsten, vanadium, chromium and molybdenum in an inert organic liquid vehicle at a temperature within the range of 25 to 200° C. and at a pressure of 25 to 1000 p.s.i., the valences of said transition element being satisfied by only tetraphenylborate groups.

4. The process for polymerizing ethylene to solid polymer which comprises contacting ethylene with a catalyst consisting essentially of titanium tetraphenylborate in an inert organic liquid vehicle at a temperature within the range of 25 to 200° C. and at a pressure of 25 to 1000 p.s.i., the valences of said titanium being satisfied by only tetraphenylborate groups.

5. The process for polymerizing propylene to solid polymer which comprises contacting propylene with a catalyst consisting essentially of titanium tetraphenylborate in an inert organic liquid vehicle at a temperature within the range of 25 to 200° C. and at a pressure of 25 to 1000 p.s.i., the valences of said titanium being satisfied by only tetraphenylborate groups.

6. The process for polymerizing propylene to solid polymer which comprises contacting propylene with a catalyst consisting essentially of vanadium tetraphenylborate in an inert organic liquid vehicle at a temperature within the range of 25 to 200° C. and at a pressure of 25 to 1000 p.s.i., the valences of said vanadium being satisfied by only tetraphenylborate groups.

7. The process for polymerizing propylene to solid polymer which comprises contacting propylene with a catalyst consisting essentially of chromium tetraphenylborate in an inert organic liquid vehicle at a temperature within the range of 25 to 200° C. and at a pressure of 25 to 1000 p.s.i., the valences of said chromium being satisfied by only tetraphenylborate groups.

8. The process for polymerizing propylene to solid polymer which comprises contacting propylene with a catalyst consisting essentially of molybdenum tetraphenylborate in an inert organic liquid vehicle at a temperature within the range of 25 to 200° C. and at a pressure of 25 to 1000 p.s.i., the valences of said molybdenum being satisfied by only tetraphenylborate groups.

9. The process for polymerizing propylene to solid polymer which comprises contacting propylene with a catalyst consisting essentially of zirconium tetraphenylborate in an inert organic liquid vehicle at a temperature within the range of 25 to 200° C. and at a pressure of 25 to 1000 p.s.i., the valences of said zirconium being satisfied by only tetraphenylborate groups.

References Cited in the file of this patent

UNITED STATES PATENTS

| 2,728,757 | Field et al. | Dec. 27, 1955 |
| 2,728,758 | Field et al. | Dec. 27, 1955 |

FOREIGN PATENTS

| 1,134,740 | France | Dec. 3, 1956 |
| 1,160,864 | France | Mar. 10, 1958 |
| 1,161,213 | France | Mar. 17, 1958 |
| 801,401 | Great Britain | Sept. 10, 1958 |

OTHER REFERENCES

Coates: Organo-metallic Compounds, Wiley & Sons, Inc. (New York), 1956, pages 69, 70.